United States Patent
Hsia et al.

(10) Patent No.: US 11,152,809 B2
(45) Date of Patent: Oct. 19, 2021

(54) USER BEHAVIOR DRIVEN CHARGE LEVELS

(71) Applicant: HEWLETT-PACKARD DEVELOPMENT COMPANY, L.P., Spring, TX (US)

(72) Inventors: Yi-Fan Hsia, Taipei (TW); Pi-Fang Lai, Taipei (TW); Jen-Hao Tai, Taipei (TW); Hung Lung Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,094

(22) PCT Filed: Oct. 30, 2017

(86) PCT No.: PCT/US2017/058990
§ 371 (c)(1),
(2) Date: Jul. 26, 2019

(87) PCT Pub. No.: WO2019/088968
PCT Pub. Date: May 9, 2019

(65) Prior Publication Data
US 2021/0135480 A1    May 6, 2021

(51) Int. Cl.
*H02J 7/00* (2006.01)
*G06F 1/26* (2006.01)
*H02J 7/04* (2006.01)

(52) U.S. Cl.
CPC ........ *H02J 7/007194* (2020.01); *G06F 1/263* (2013.01); *H02J 7/0047* (2013.01); *H02J 7/04* (2013.01)

(58) Field of Classification Search
CPC ...... H02J 7/007194; H02J 7/0047; H02J 7/04; H02J 7/02; G06F 1/263
See application file for complete search history.

(56) References Cited

U.S. PATENT DOCUMENTS

| | | | |
|---|---|---|---|
| 7,191,077 B2 | 3/2007 | Mese et al. | |
| 7,888,913 B1 | 2/2011 | Marty et al. | |
| 8,283,955 B2 | 10/2012 | Redman-White | |
| 8,922,329 B2 | 12/2014 | Davis et al. | |
| 8,933,586 B2 * | 1/2015 | Takano | H02J 7/0071 307/38 |

(Continued)

FOREIGN PATENT DOCUMENTS

CN    105024422 B    11/2015

OTHER PUBLICATIONS

Hoke, A., "Accounting for Lithium-ion Battery Degradation in Electric Vehicle Charging Optimization", Jul. 30, 2014.

*Primary Examiner* — Stacy Whitmore
(74) *Attorney, Agent, or Firm* — Brooks, Cameron and Huebsch, PLLC

(57) ABSTRACT

In some examples, an electronic device can include a battery, a power adapter, a processing resource, and a memory resource storing machine-readable instructions to cause the processing resource to determine monitored user behavior data exceeds a predetermined threshold, and responsive to the predetermined threshold being exceeded, provide a notification including a recommended threshold charge level, where the recommended threshold charge level is a percentage of an overall possible charge percentage of the battery.

12 Claims, 3 Drawing Sheets

(56) References Cited

U.S. PATENT DOCUMENTS

| | | | |
|---|---|---|---|
| 9,218,108 B1* | 12/2015 | Parthasarathy | G06F 1/263 |
| 9,300,015 B2* | 3/2016 | Chang | H02J 7/0021 |
| 2008/0218125 A1 | 9/2008 | Bansal et al. | |
| 2012/0065909 A1* | 3/2012 | Patino | H02J 7/0048 |
| | | | 702/63 |
| 2014/0082384 A1 | 3/2014 | de Cesare et al. | |
| 2015/0123595 A1 | 5/2015 | Hussain et al. | |
| 2016/0064960 A1* | 3/2016 | DiCarlo | H02J 7/007 |
| | | | 320/134 |
| 2016/0064961 A1 | 3/2016 | DiCarlo et al. | |
| 2016/0261122 A1 | 9/2016 | Childress et al. | |
| 2017/0054317 A1 | 2/2017 | Katsuki et al. | |
| 2018/0262027 A1* | 9/2018 | Jung | H02J 7/0031 |
| 2019/0319465 A1* | 10/2019 | Si | H02J 7/0029 |
| 2020/0169107 A1* | 5/2020 | Joshi | H02J 7/0047 |

\* cited by examiner

USER BEHAVIOR DRIVEN CHARGE LEVELS

BACKGROUND

Portable electronic devices, such as laptop computers, portable media players, and/or mobile phones, can operate using a rechargeable battery. A rechargeable battery can have a charging cycle to maximize its service life. Certain battery types, for example, can have a longer service life when they are fully discharged before being recharged. Existing electronic devices having built-in charging systems (such as laptops) may not adapt the charging cycle to match the use of the battery. Existing chargers can continue to charge the battery as long as the AC cord is plugged into the electronic device. The battery may charge to capacity and continue to charge until the AC power cord is unplugged.

DETAILED DESCRIPTION

Various examples provide for user behavior driven charge levels. Portable electronic devices are becoming increasingly popular. The popularity of tablet personal computers, portable media players, mobile phones and laptops are on the rise. A commonality between all of these electronic devices is that they can all include rechargeable batteries (e.g., a nickel-cadmium (Ni-Cad) battery or a lithium-ion (Li+)) as a power source.

During operation, the battery's capacity may diminish over time from an increase in internal impedance, electrode and electrolyte degradation, excessive heat, and/or abnormal use. Continued use of a battery over time may produce swelling in the battery's cells and may eventually cause the battery to exceed the designated maximum physical dimensions of the device. Additionally, battery-monitoring mechanisms may not include functionality to manage swelling of the battery. As a result, a user of the device may not be aware of the battery's swelling and/or degradation until the swelling results in physical damage to the device.

Accordingly, the disclosure is directed to user behavior driven charge levels. Desirably, user behavior driven charge levels disclosed herein may reduce battery cell swelling. For instance, an electronic device can provide a notification including a recommended threshold charge level, where the recommended threshold charge level is a percentage of an overall possible charge percentage of the battery. Additionally, the electronic device can set a power adapter to the recommended threshold level to reduce battery cell swelling.

Figure 1:
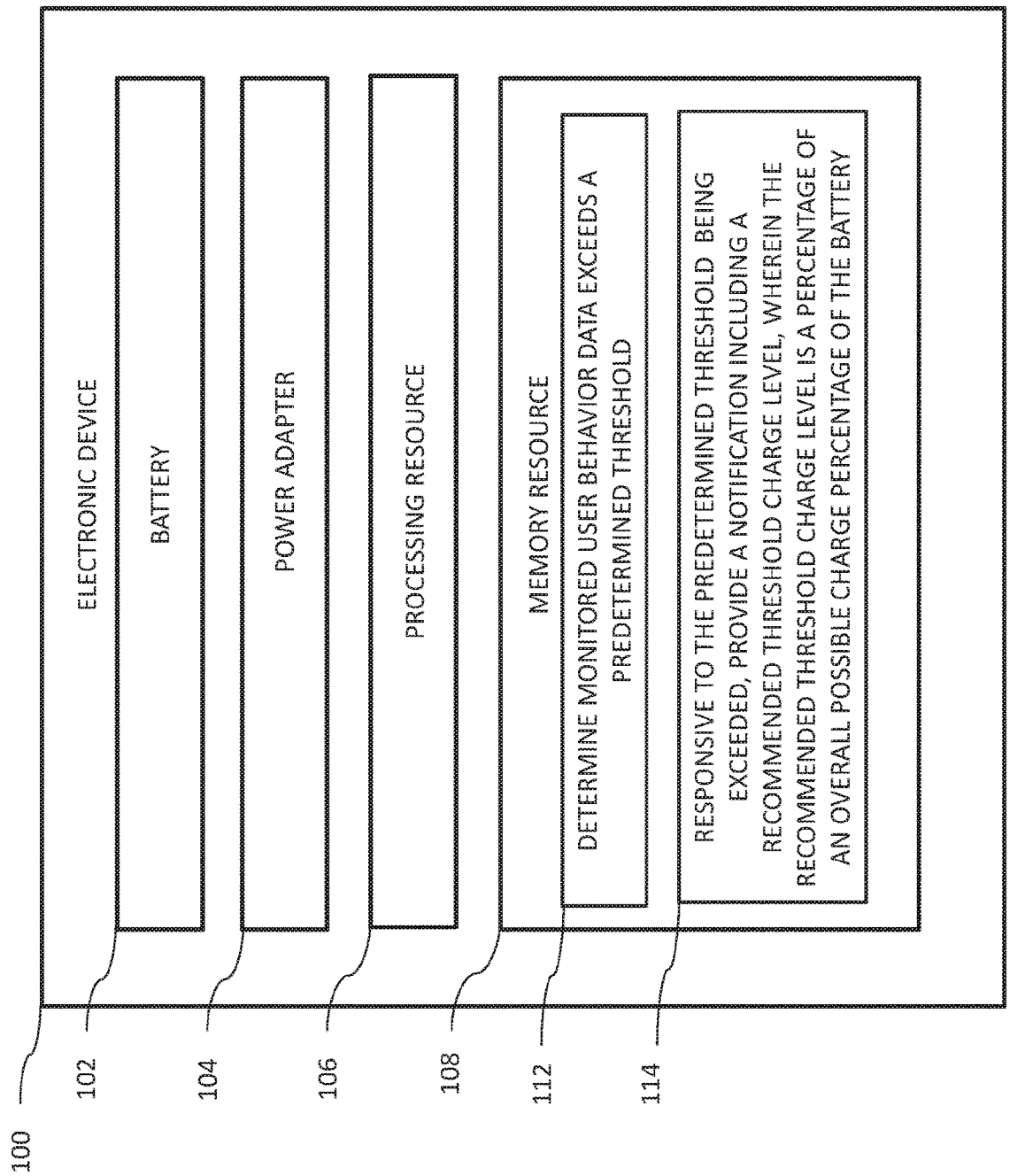
FIG. 1 illustrates an example of an electronic device suitable with user behavior driven charge levels consistent with the present disclosure.

FIG. 1 illustrates an example of an electronic device 100 suitable with user behavior driven charge levels consistent with the present disclosure. The electronic device 100 can be, for example, a mobile phone (e.g., a smartphone), a media player, a tablet computer, or a laptop computer, among other types of electronic devices including a rechargeable battery as a power source. As illustrated in FIG. 1, the electronic device 100 can include a battery 102, a power adapter 104, a processing resource 106, and a memory resource 108.

Battery 102 can include one or more cells in a parallel and/or series configuration that supply power to the electronic device 100. Battery 102 can be a rechargeable battery. For example, battery 102 can be lithium-polymer, lithium-ion, lead-acid, nickel cadmium or the like. Battery 102 can be reused up to a number of charge cycles before losing enough capacity to reach an end-of-life capacity threshold. Battery 102 can also swell as capacity diminishes over time. A swollen battery can occur when the battery's cells are overcharged. Overcharging can cause a buildup of gas inside the battery due to electrochemical oxidation of electrolytes within the battery.

Power adapter 104 can have an input coupled to an external power source to receive a voltage to provide power to the battery 102. Power adapter 104 can be set with charge parameters to produce voltage and current to battery 102. Charge parameters can include the charge level of the battery 102. Setting the power adapter with the charge level may not allow the battery to charge to a percentage of the overall possible charge that exceeds the recommended charge level.

For example, the battery 102 can be set by the power adapter 104 to charge to a charge level between 1% and 100%. It is noted that in some examples the recommended charge level is less than the overall possible charge level. In such examples, setting the power adapter 104 with the charge level may not allow the battery 102 to charge to a percentage of the overall possible charge that exceeds the charge level. For example, if the battery 102 is set with a charge level of 80%, the battery may not charge to a level exceeding 80%. Setting the battery 102 to charge to a charge level that is less than the overall possible charge level can decrease the risk of battery swelling. For example, a charge level of less than 100% can reduce the risk of battery swelling.

As illustrated in FIG. 1, the electronic device 100 can include a processing resource 106 coupled to the memory resource 108, on which instructions may be stored, such as instructions 112 and 114. Although the following descriptions refer to an individual processing resource and an individual memory resource, the descriptions may also apply to a system with multiple processing resources and multiple memory resources. In such examples, the instructions may be distributed (e.g., stored) across multiple processing resources.

Processing resource 106 may be a central processing unit (CPU), a semiconductor based microprocessor, and/or other hardware devices suitable for retrieval and execution of instructions stored in memory resource 108. Processing resource 106 may fetch, decode, and execute instructions 112 and 114, or a combination thereof. As an alternative or in addition to retrieving and executing instructions, processing resource 106 may include an electronic circuit that includes electronic components for performing the functionality of instructions 112 and 114, or combination thereof.

Memory resource 104 can be volatile or nonvolatile memory. Memory resource 104 can be removable (e.g., portable) memory, or non-removable (e.g., internal) memory. For example, memory resource 104 can be random access memory (RAM) (e.g., dynamic random access memory (DRAM) and/or phase change random access memory (PCRAM)), read-only memory (ROM) (e.g., electronically erasable programmable read-only memory (EEPROM) and/or compact-disk read-only memory (CR- ROM), flash memory, a laser disc, a digital versatile disk (DVD) or other optical disk storage, and/or a magnetic medium such as magnetic cassettes, tapes, or disks, among other types of memory.

Instructions 112, when executed by processing resource 106, can cause processing resource 106 to determine monitored user behavior data exceeds a predetermined threshold. The user behavior data can be monitored over a predetermined interval of time. For example, the user behavior data can be monitored over one day, two days or the like. The user behavior data can be monitored until the battery 102 is replaced and/or the battery 102 is no longer used to power the electronic device 100. Accordingly, the management of the charging technique, as described herein, can be used to set the battery 102 to a recommended threshold charge level that can increase the life of the battery 102 by decreasing the risk of battery swelling.

The electronic device 100 can monitor a number of user behaviors relating to the battery 102. User behavior data can include a lowest remaining battery percentage of the battery 102 over the predetermined interval of time. The lowest remaining battery percentage can be the least amount of charge that the battery 102 experiences over an interval of time. For example, over a predetermined interval of time the user may not allow the battery percentage of the electronic device 100 to drop below an overall percentage of 10%.

Monitoring the user behavior can also include monitoring the temperature of the battery 102 over the predetermined interval of time. The temperature that is monitored by electronic device 100 can be based on the type of battery that the electronic device 100 includes. For example, different battery cells can be set to operate at different temperatures. Therefore, different batteries can have different predetermined temperature thresholds.

Monitoring the user behavior data can also include monitoring a percentage of time the battery 102 exceeds the predetermined threshold temperature over the predetermined interval of time. For example, the electronic device 100 can monitor the percentage of time the battery 102 exceeds 40° c. Monitoring the user behavior can also include monitoring the percentage of time the battery 102 is below the predetermined threshold temperature.

Monitoring the user behavior can also include monitoring the percentage of time the lowest remaining battery percentage exceeds the predetermined threshold temperature. The electronic device 100 can monitor the percentage of time the battery 102 is over the predetermined threshold temperature while at an overall percentage charged. For example, the electronic device 100 can monitor the percentage of time the temperature of the battery 102 exceeds the predetermined temperature threshold while the remaining battery percentage is between 90% and 70% or another predetermined range.

Instructions 114, when executed by processing resource 106, can cause processing resource 106 to responsive to the predetermined threshold being exceeded, provide a notification including a recommended threshold charge level. The predetermined threshold can be based on a number of factors. For example, the predetermined threshold can be based on the monitored user behaviors and/or a criterion which may result in a risk of battery swelling.

The predetermined threshold can include a temperature of the battery 102 over the predetermined interval of time that can result in a risk of the battery 102 swelling. For example, if the electronic device 102 determines that the temperature of the battery 102 exceeds the predetermined threshold temperature, the charge level of the battery 102 may be reset.

The predetermined threshold can include a percentage of time the battery 102 exceeds the predetermined threshold temperature over the predetermined interval of time that can result in a risk of the battery 102 swelling. For example, if the electronic device 102 determines that the battery 102 exceeds the predetermined threshold percentage of time the battery 102 exceeds the predetermined threshold temperature over the predetermined interval temperature, the charge level of the battery 102 may be reset.

The predetermined threshold can include a lowest remaining battery percentage of the battery 102 over the predetermined interval of time that can result in a risk of the battery 102 swelling. For example, if the electronic device 102 determines that the lowest remaining battery percentage is less than the predetermined lowest remaining battery percentage threshold, the charge level of the battery 102 may be reset.

The predetermined threshold can include a percentage of time the lowest remaining battery percentage exceeds the predetermined threshold temperature that results in a risk of the battery 102 swelling. For example, if the electronic device 102 determines that the percentage of time the lowest remaining battery exceeds the predetermined threshold percentage, the charge level of the battery 102 may be reset.

In response to the electronic device 100 detecting that the battery 102 exceeds the predetermined threshold, the electronic device 100 can provide a notification. Notifications can include a visual display on a display of electronic device 100 and/or a display of another electronic device. A display can include, for example, a liquid crystal display (LCD), an active matrix liquid crystal display (AMLCD), a computer monitor, a television, a plasma display, a cathode ray tube (CRT) display, a light emitting diode (LED) display, a digital light processing (DLP) display, a surface-conduction electron-emitter display (SED), a field emission display (FED), and/or a variety of other methods for electronically displaying images.

The notification can include a recommended threshold charge level. The recommended threshold charge level can be a percentage of an overall possible charge percentage of the battery 102. For example, electronic device 100 can display the recommended threshold charge level via a text-based notification on its display. The recommended threshold charge level can be a percentage of an overall possible charge that may reduce battery swelling.

In some examples, the electronic device 100 may determine the user behavior data does not exceed the predetermined threshold. In response to the electronic device 100 determining that the user behavior data does not exceed the predetermined threshold, the electronic device 100 can provide a notification to the user. The notification can inform the user that the battery 102 is not at risk of swelling.

While not illustrated in FIG. 1, instructions, when executed by processing resource 106, can cause processing resource 106 to set the power adapter 104 to the recommended threshold charge level. The power adapter 104 can be set to the recommended threshold charge level to limit an amount of charge provided by the power adapter 104 to the battery 102 relative to the overall possible charge percentage of the battery 102. The battery 102 can be reset in response to receiving an input to set the power adapter to the recommended charge level, where the input is received responsive to providing the notification.

The charging parameters, such as the battery charge level, for the battery 102 can be modified based on the monitored user behavior data exceeding the predetermined threshold. Modifying the parameters can manage at least one of a cycle life of the battery 102 and swelling in the battery 102. For example, the charging parameters can be modified by a management apparatus such as a processor, SMC, charger, BMU and/or processor or circuit in the electronic device. The charging technique can be modified to extend the cycle life of the battery 102 runtime that accommodates the user behavior of the user. For example, swelling associated with high states-of-charge in the battery 102 can be mitigated by adjusting the charging technique so that the battery 102 spends less time at high charged levels. Moreover, the charging parameters can be modified in a way that is not noticeable by the user and/or does not interfere with the user's regular user of the electronic device 100.

Figure 2:
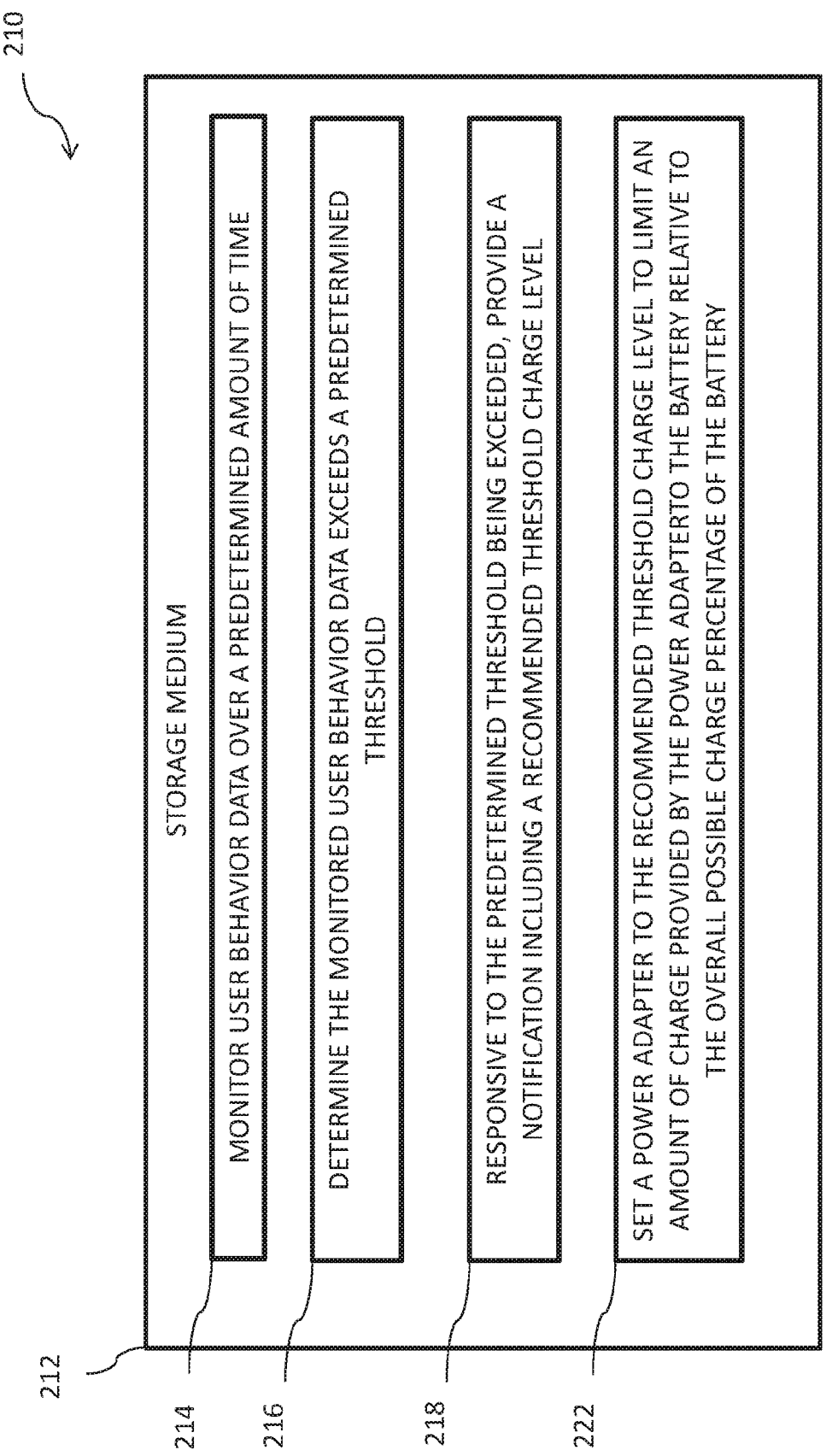
FIG. 2 illustrates an example of a system suitable with user behavior driven charge levels consistent with the present disclosure.

FIG. 2 illustrates an example system 210 suitable with user behavior driven charge levels consistent with the present disclosure, System 210 may include a non-transitory machine readable storage medium 212. Non-transitory machine readable storage medium 212 may be an electronic, magnetic, optical, or other physical storage device that stores executable instructions. Thus, non-transitory machine readable storage medium 212 may be, for example, Random Access Memory (RAM), an Electrically-Erasable Programmable Read-Only Memory (EEPROM), a storage drive, an optical disc, and the like. Non-transitory machine readable storage medium 212 may be disposed within system 210, as shown in FIG. 2. In this example, the executable instructions may be "installed" on the system 210. Additionally and/or alternatively, non-transitory machine readable storage medium 212 may be a portable, external or remote storage medium, for example, that allows system 210 to download the instructions from the portable/external/remote storage medium. In this situation, the executable instructions may be part of an "installation package". As described herein, non-transitory machine readable storage medium 212 may be encoded with executable instructions for a performance threshold.

Instructions 214 may include instructions to monitor user behavior data over a predetermined interval of time. As described herein, an electronic device can monitor user behavior data relating to the charging of a rechargeable battery within the electronic device. An electronic device can include a mobile phone (e.g., a smartphone), a media player, a tablet computer, or a laptop computer, among other types of electronic devices including a rechargeable battery as the power source.

As described herein, the electronic device can monitor a number of user behaviors including a lowest remaining battery percentage of the battery over the predetermined interval of time, the temperature of the battery over the predetermined interval of time, the percentage of time the battery exceeds the predetermined threshold temperature over the predetermined interval of time, the percentage of time the lowest remaining battery percentage exceeds the predetermined threshold temperature, among other user behaviors. The monitored user behavior data can be compared to a predetermined threshold value to determine whether there is a risk of the battery within the electronic device swelling.

Instructions 216 may include instructions to determine the monitored user behavior data exceeds a predetermined threshold. As described herein, user behavior exceeding the predetermined threshold can produce swelling in the battery's cells and may eventually cause the battery to exceed the designated maximum physical dimensions of the device. The predetermined threshold can be based on the monitored user behaviors and/or a criterion which can increase the risk of battery swelling.

As described herein, the predetermined threshold can include a temperature of the battery over the predetermined interval of time, a percentage of time the battery exceeds the predetermined threshold temperature over the predetermined interval of time, a lowest remaining battery percentage of the battery over the predetermined interval of time, and a percentage of time the lowest remaining battery percentage exceeds the predetermined threshold temperature that can result in a risk of the battery swelling, among other predetermined thresholds that can result in a risk of battery swelling. Based on the determination that the monitored user behavior data exceeds a predetermined threshold, the charge level of the battery can be reset to a charge level that may decrease the risk that the battery will experience swelling.

Instructions 218 may include instructions to responsive to the predetermined threshold being exceeded, provide a notification including a recommended threshold charge level. For example, the threshold charge level can be a percentage of an overall possible charge percentage of a battery. As described herein, the notifications can include a visual display on a display of electronic device and/or a display of another electronic device.

As described herein, the notification can include a recommended threshold charge level. The recommended threshold charge level can be a percentage of an overall possible charge percentage of the battery. For example, electronic device can display the recommended threshold charge level via a text-based notification on its display. The recommended threshold charge level can be a percentage of an overall possible charge that may reduce the risk of battery swelling.

Instructions 222 may include instructions to set a battery charger to the recommended threshold charge level to limit an amount of charge provided by the power adapter to the battery relative to the overall possible charge percentage of the battery. As described herein, the power adapter can have an input coupled to an external power source to receive a voltage to provide power to the battery. The power adapter can be set with the recommended charge level so that the percentage of charge does not exceed the recommended charge level percentage.

Figure 3:
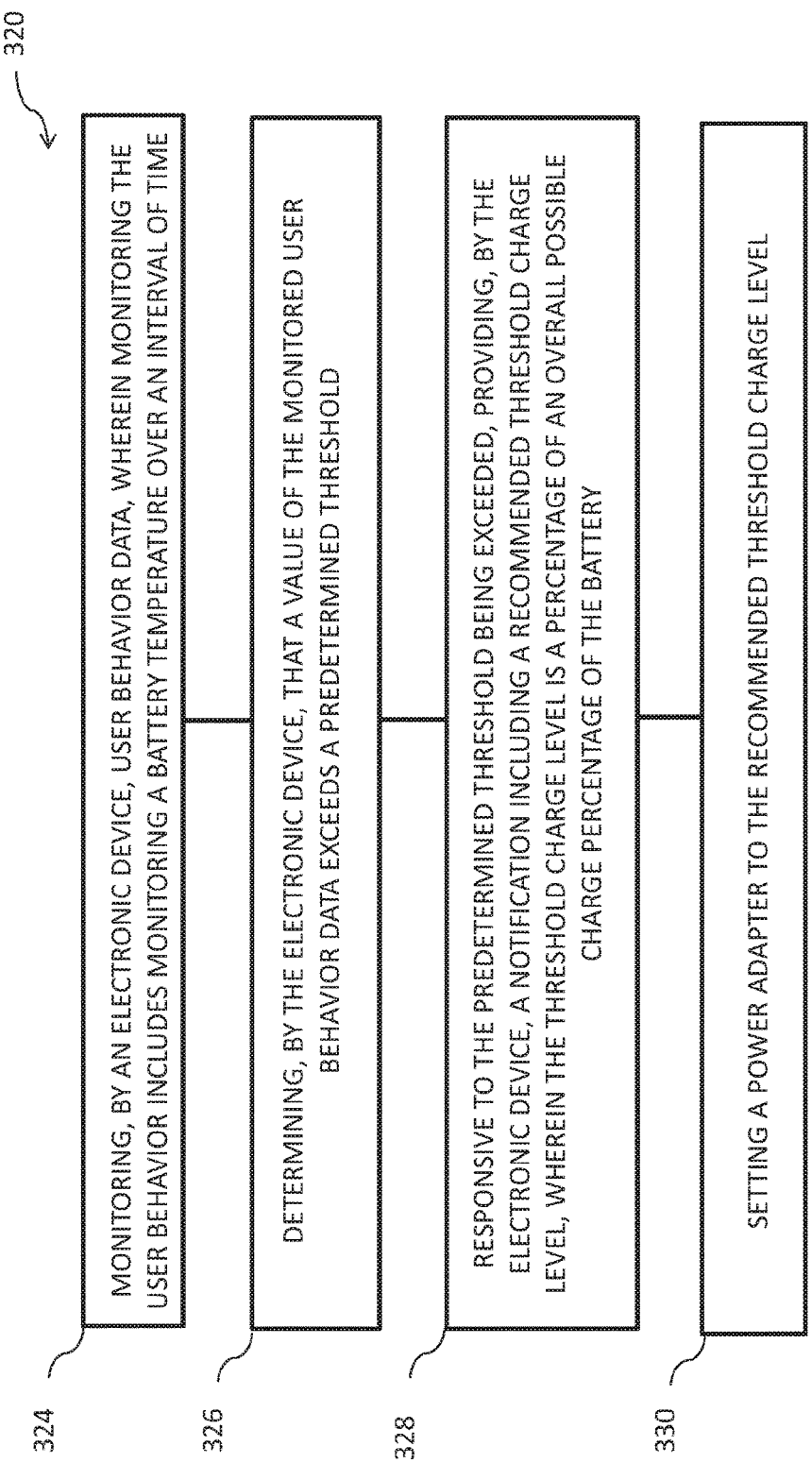
FIG. 3 illustrates an example of a method user behavior driven charge levels consistent with the present disclosure

FIG. 3 illustrates an example of method 320 of user behavior driven charge levels consistent with the present disclosure. In some examples, the method 320 can be performed by an electronic device.

As described herein, at 324, the method 320 can include monitoring, by an electronic device, user behavior data. The electronic device can monitor a number of user behaviors relating to the charging of the battery. For example, monitoring the user behavior data can include monitoring a battery temperature over an interval of time. The electronic device can monitor the temperature of the battery to determine whether the battery is operating at a temperature that can result in a risk of battery swelling.

As described herein, at 326, the method 320 can include determining, by the electronic device, that a value of the monitored user behavior data exceeds a predetermined threshold. For example, the predetermined threshold can be a percentage of time the battery is operating above a predetermined temperature. Additionally, the monitored user behavior data can include a monitored percentage of time the battery operates above the predetermined temperature. The predetermined threshold can be a percentage of time the battery exceeds the predetermined threshold temperature.

As described herein, at 328, the method 320 can include responsive to the predetermined threshold being exceeded, providing, by the electronic device, a notification including a recommended threshold charge level. For example, the threshold charge level can be a percentage of an overall possible charge percentage of the battery. The threshold charge level can be based on the charge level that can decrease the risk that the battery within the electronic device swells. Providing the notification including a recommended threshold charge level can include displaying a text-based notification on a display of the electronic device.

As described herein, at 330, the method 320 can include setting a power adapter to the recommended threshold charge level. For example, responsive to providing the notification, the electronic device can receive an input to set the power adapter to the recommended threshold charge level. The recommended threshold charge level can be an amount of charge provided by the power adapter that can decrease the risk of battery swelling in the electronic device.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. An electronic device, comprising:
   a battery;
   a power adapter to couple to an external power source;
   a processing resource; and
   a memory resource storing machine-readable instructions to cause the processing resource to:
      determine a battery charge level exceeds a threshold charge level when the power adapter is coupled to the external power source;
      responsive to the threshold charge level being exceeded, provide a notification including a recommended threshold charge level of the battery that is less than an overall possible charge level of the battery, wherein the recommended threshold charge level is a percentage of an overall possible charge percentage of the battery;
      receive an input to set the power adapter to the recommended threshold charge level; and
      responsive to a receipt of the input, set the power adapter to the recommended threshold charge level.

2. The electronic device of claim 1, wherein the monitored user behavior data includes a length of time the battery is above a threshold temperature over an interval of time.

3. The electronic device of claim 1, wherein the notification can include a visual display on a display of the electronic device.

4. The computing device of claim 1, wherein the power adapter includes an input coupled to an external power source to receive a voltage and provide power to the battery.

5. The computing device of claim 1, wherein the battery is a rechargeable battery.

6. A non-transitory machine-readable storage medium having stored thereon machine-readable instructions to cause a computing processor to:
   monitor a lowest remaining battery charge level over an amount of time;
   determine the lowest remaining battery charge level exceeds a threshold;
   responsive to the threshold being exceeded, provide a notification including a recommended threshold charge level of a battery that is less than an overall possible charge level of the battery, wherein the recommended threshold charge level is a percentage of an overall possible charge percentage of the battery;
   receive an input to set the power adapter to the recommended threshold charge level; and
   set the power adapter to the recommended threshold charge level to limit an amount of charge provided by the power adapter to the battery relative to the overall possible charge percentage of the battery.

7. The medium of claim 6, further comprising instructions to determine the user behavior data does not exceed a threshold.

8. The medium of claim 7, wherein responsive to the threshold charge level not being exceeded, providing a notification including a recommended threshold charge level based on the charge level not being exceeded.

9. The medium of claim 6, wherein the threshold is a remaining battery percentage of the battery over the amount of time.

10. A method comprising:
    monitoring, by an electronic device, user behavior data, wherein monitoring the user behavior data includes monitoring a battery temperature and a lowest battery charge level over an interval of time;
    determining, by the electronic device, that a value of the lowest battery charge level exceeds a threshold charge level;
    responsive to the threshold charge level being exceeded, providing, by the electronic device, a notification including a recommended threshold charge level of the battery that is less than an overall possible charge level of the battery, wherein the threshold charge level is a percentage of an overall possible charge percentage of the battery;
    responsive to providing the notification, receiving an input to set the power adapter to the recommended threshold charge level; and responsive to receiving the input, setting a power adapter to the recommended threshold charge level.

11. The method of claim 10, wherein the threshold is a percentage of time the battery is operating above a temperature, and wherein the monitored user data includes a monitored percentage of time the battery operates above the temperature.

12. The method of claim 11, wherein providing the notification including a recommended threshold charge level includes displaying a text-based notification on a display of the electronic device.

* * * * *